Figure 1:
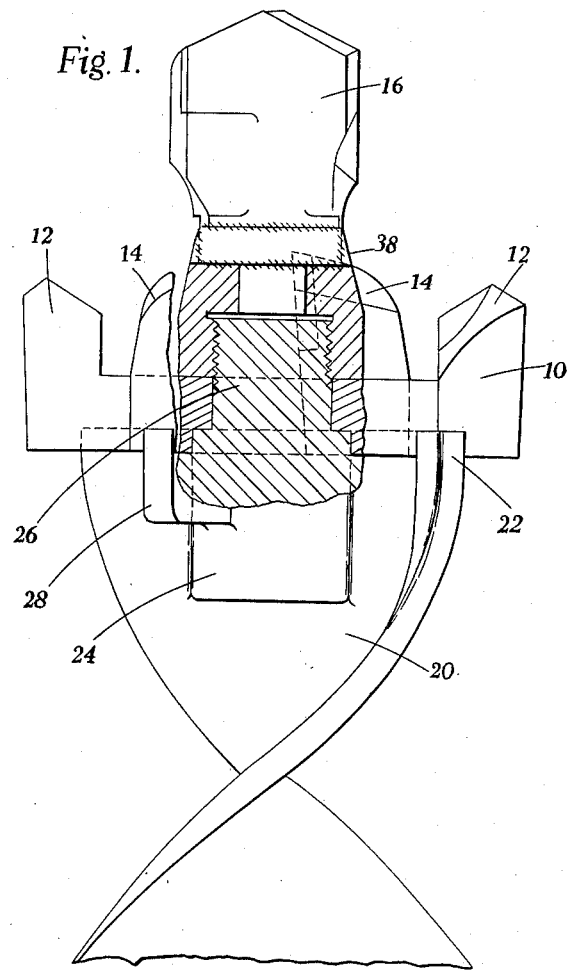

April 22, 1941.  R. W. MANN  2,239,461
ROCK BORING BIT
Filed Aug. 26, 1939  3 Sheets-Sheet 1

INVENTOR
R. W. MANN
BY
ATTORNEY.

April 22, 1941. R. W. MANN 2,239,461
ROCK BORING BIT
Filed Aug. 26, 1939 3 Sheets-Sheet 2

INVENTOR
R. W. MANN

April 22, 1941.  R. W. MANN  2,239,461
ROCK BORING BIT
Filed Aug. 26, 1939  3 Sheets-Sheet 3

INVENTOR
R.W. MANN.
BY
ATTORNEYS.

Patented Apr. 22, 1941

2,239,461

UNITED STATES PATENT OFFICE 2,239,461

ROCK BORING BIT

Reginald William Mann, Monkseaton, England

Application August 26, 1939, Serial No. 292,145
In Great Britain August 31, 1938

8 Claims. (Cl. 255—69)

This invention relates to bits for use in boring holes in stone or coal in quarrying or mining operations.

The making of an ordinary shot-hole of anything up to two inches diameter and a few feet in depth is referred to as drilling. Drilling can be effected satisfactorily by means of an unguided rotary bit, that is to say, a bit which is of considerably larger diameter than the rod which carries it. A larger hole, say up to four inches or so in diameter, can be drilled by adding a reamer bit having teeth or wings at a greater radius than the teeth or wings of the bit first mentioned, which then becomes a pilot bit. If, however, a much deeper hole of this larger diameter, for example more than twelve feet deep is to be made, a different technique must be employed and the operation is referred to as boring. If a small diameter rod is used for very deep holes of this kind the drilling bit "runs" to one side and the curvature or deviation of the hole caused thereby very soon brings the operation to a standstill.

Hitherto the usual tool for boring, called a scroll bit, consisted of two ribs helically curved and intertwined, resembling rather the so-called Archimedean screw. The ends of these two ribs were ground to form cutting edges and the helical edges of the ribs, being of the same diameter as the cutting edges, fitted the hole and guided these cutting edges.

The rate at which such a tool cuts is slow and moreover it has the disadvantage that it has to be withdrawn frequently for regrinding. It is the object of this invention to avoid these disadvantages by providing means whereby drilling bits consisting of a pilot and a reamer bit can be detachably mounted on a scroll which acts as a guide for them.

According to this invention the extremity of the scroll is formed with a central spigot screw-threaded for the reception of a nut, and a reamer bit is formed with a socket to fit the spigot and with a transverse groove to fit the extremities of the ribs of the scroll, which transmit the torque to the reamer bit. Thus, the reamer bit is secured sufficiently firmly to resist the heavy stresses that occur when the tool is withdrawn from the hole, which would inevitably shear the retaining pin which has hitherto been employed.

The pilot bit may be provided with a shank or stalk as in ordinary drilling practice, this shank or stalk being received in a socket within the spigot and secured by a retaining pin engaging a groove in the shank. In this case the nut which secures the reamer bit is formed as a cap nut with a central hole to admit the stalk or shank and is formed with a groove engaging the ends of the wings of the pilot bit to transmit the torque thereto. In some cases this method of retaining the pilot bit may prove to be insufficiently secure and it is therefore preferred to make the pilot bit and the nut in one piece, or in two pieces secured together permanently by welding.

It is sometimes necessary to drill a short hole of large diameter so as to be perfectly straight and of true diameter, as for instance when a hydraulic burster or similar appliance is to be used instead of an explosive, and the invention is specially useful in such cases.

Figure 2:
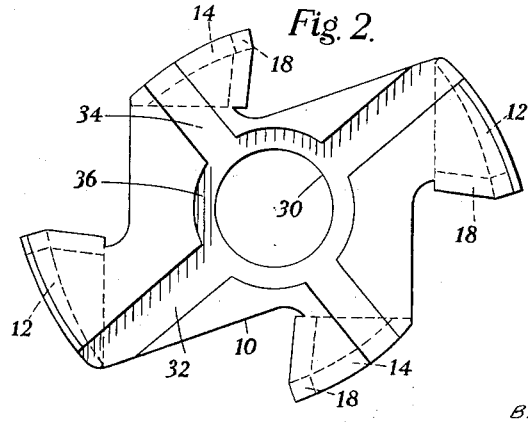
Figure 3:
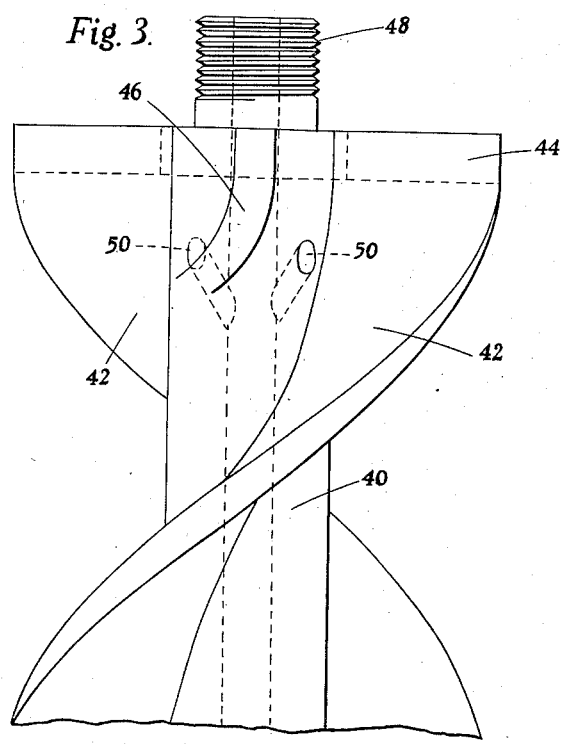
Figure 4:
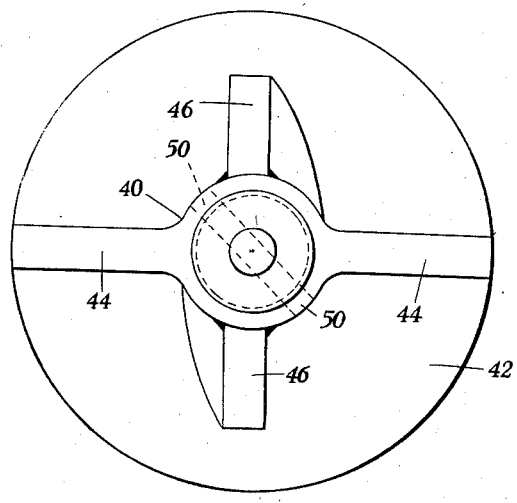
Figure 5:
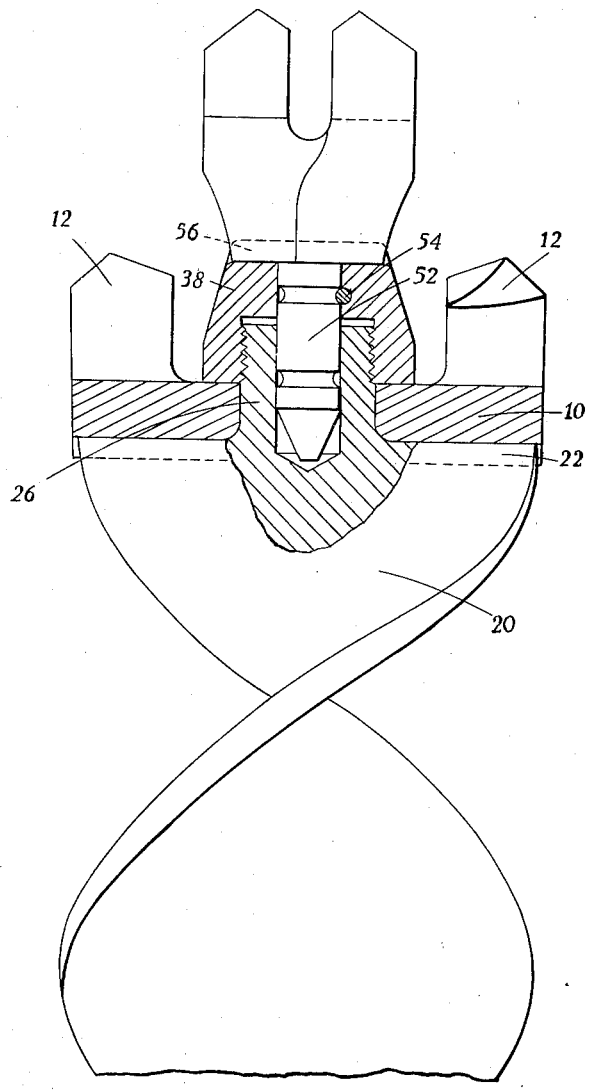

Referring to the accompanying drawings,

Figure 1 is a side elevation of a preferred form of the improved boring bit, partly in section, Figure 2 is an under plan of the reamer bit, Figure 3 is a side elevation of a modified form of scroll, Figure 4 is a plan of the scroll shown in Figure 3, and Figure 5 is a view similar to Figure 1 showing an alternative construction.

Referring to Figures 1 and 2, the reamer bit 10 has four wings or blades two of which, 12, are at the proper radial distance to cut out the full diameter of the hole, in this case about 4 inches, while the other two, 14, arranged along a diameter at right angles to the diameter first mentioned, are at a smaller radial distance so that they fill in the zonal gap between the outer edges of the pilot bit 16 and the inner edges of the blades 12. Thus, no cores are formed, the whole area of the cross-section of the hole being cut away by the blades as indicated in dotted lines and cross-hatching in Figure 1. The pilot bit may be of the chisel type shown in Figure 1 or it may be of any other type, for example that having two blades or wings separated by a central gap as shown in Figure 5. All four blades are provided with tungsten carbide tips 18, Figure 2.

The end of the scroll 20 is straightened for a short distance at its end as indicated at 22 and a cylindrical spigot 24 is welded centrally in the end of the scroll, this spigot having a screw-threaded portion 26 of reduced diameter and two lateral wings or ribs 28 extending at right angles to the parts 22.

The base of the reamer bit is formed with a central hole 30 and two grooves 32, 34 at right angles to one another, and also a rebate 36 surrounding the hole 30. The grooves 32 and 34 fit over the extremities of the ribs 22 and 28 and the rebate fits over the full diameter part of the spigot 24, the driving torque being transmitted from these ribs to the sides of the grooves 32 and 34. The bit is secured to the scroll by a nut 38 screwing on to the spigot 26 and the pilot 16 is integral with or welded to the nut 38.

Figures 3 and 4 illustrate an alternative form of scroll compressing a tubular core 40 with two helical ribs 42 straightened at their extremities 44. Additional ribs 46, similar to the ribs 28 shown in Figure 1, are welded to the core 40, their extremities being straightened in the same way as the extremities 44 of the ribs 42. The core 40 has an externally screwthreaded extension or spigot 48 fitting the central hole 30 in the reamer bit, the full diameter part of the core 40 fitting the rebate 36 as in the construction first described.

For wet boring the core 40 is formed with two oblique holes 50, through which water supplied to the bore of the core can escape. As shown, they are inclined forwardly at an acute angle so that the water issuing from this impinges upon the surface being cut by the reamer bit. The arrangement of the wings or blades of the reamer bit may differ from that illustrated. As mentioned above, the wings in the example illustrated are staggered so that no core is left, but when boring friable materials the four wings may all be at the same radius, and in some cases it is possible to use only two wings.

In some cases, as shown in Figure 5, the pilot bit 16 may be separate from the nut 38, being formed with a shank 52 grooved as shown for the reception of a retaining pin 54 and fitting into a cross-slot 56 in the end of the nut. This construction enables the pilot bit to be readily replaced, but the form shown in Figure 1 is preferred because there is no risk of the pilot bit becoming detached and left behind in the bore when the tool is withdrawn.

As will be seen from a comparison of Figures 2 and 3 or from an inspection of Figure 5, the diameter of the reamer bit 10 is only very slightly greater than the diameter of the scroll, which therefore fits the hole cut by the reamer bit and guides the cutting edges of the bit. Moreover, the pilot bit itself tends to guide the reamer bit and prevent its cutting edges from wandering, with the result that the hole which is bored is of an arcuate diameter and is straight even over a considerable length.

I claim:

1. A rock boring bit comprising in combination a scroll having at its extremity a central screw-threaded spigot, a reamer bit of substantially the same diameter as the scroll and formed with a socket to fit said spigot and with a transverse groove to fit the extremities of the ribs of the scroll, a nut screwing upon said spigot and a pilot bit secured to said nut.

2. A rock boring bit comprising in combination a scroll having at its extremity a central screw-threaded spigot, a reamer bit of substantially the same diameter as the scroll and formed with a socket to fit said spigot and with a transverse groove to fit the extremities of the ribs of the scroll, a nut screwing upon said spigot and a pilot bit integral with said nut.

3. A rock boring bit comprising in combination a scroll having at its extremity a central screw-threaded spigot, a reamer bit of substantially the same diameter as the scroll and formed with a socket to fit said spigot and with a transverse groove to fit the extremities of the ribs of the scroll, a nut screwing upon said spigot and a pilot bit welded to said nut.

4. A rock boring bit comprising in combination a scroll having its ribs straightened for a short distance at its extremities and having a central screw-threaded spigot, a reamer bit of substantially the same diameter as the scroll and formed with a socket to fit said spigot and with a transverse groove to fit the straightened extremities of the ribs of the scroll, a nut screwing upon said spigot and a pilot bit secured to said nut.

5. A rock boring bit comprising in combination a scroll having at its extremity a central screw-threaded spigot and two short additional ribs extending at right angles to the ribs of the scroll, a reamer bit of substantially the same diameter as the scroll and formed with a socket to fit said spigot and with transverse grooves to fit the extremities of the ribs of the scroll and of the additional ribs, a nut screwing upon said spigot and a pilot bit secured to said nut.

6. A rock boring bit comprising in combination a scroll having at its extremity a central screw-threaded spigot and two short additional ribs extending at right angles to the ribs of the scroll, a reamer bit of substantially the same diameter as the scroll and formed with a socket to fit said spigot and with transverse grooves to fit the extremities of the ribs of the scroll and of the additional ribs, a nut screwing upon said spigot and a pilot bit integral with said nut.

7. A rock boring bit comprising in combination a scroll having at its extremity a central screw-threaded spigot and two short additional ribs extending at right angles to the ribs of the scroll, a reamer bit of substantially the same diameter as the scroll and formed with a socket to fit said spigot and with transverse grooves to fit the extremities of the ribs of the scroll and of the additional ribs, a nut screwing upon said spigot and a pilot bit welded to said nut.

8. A rock boring bit comprising in combination a scroll having its ribs straightened for a short distance at its extremities and having a central screw-threaded spigot and two additional ribs extending at right angles to the ribs of the scroll, a reamer bit of substantially the same diameter as the scroll and formed with a socket in said spigot and with transverse grooves to fit the straightened extremities of the ribs of the scroll and the extremities of the additional ribs, a nut screwing upon said spigot and a pilot bit secured to said nut.

REGINALD WILLIAM MANN.